United States Patent
Warner et al.

[11] Patent Number: 5,826,847
[45] Date of Patent: Oct. 27, 1998

[54] TELESCOPING POLE WITH QUICK LENGTH ADJUSTMENT

[76] Inventors: Stanley H. Warner, 1700 W. Onondaga St., Syracuse, N.Y. 13204; Terry P. Warner, 84 Green St., Port Byron, N.Y. 13140

[21] Appl. No.: 885,289
[22] Filed: Jun. 30, 1997
[51] Int. Cl.[6] .................................................. A47F 5/00
[52] U.S. Cl. ................................. 248/354.1; 248/200.1
[58] Field of Search ........................ 248/200.1, 354.1; 4/576.1; 403/104, 109, 377; 297/344.18; 411/265, 267, 270, 433

[56] References Cited

U.S. PATENT DOCUMENTS

| | | | |
|---|---|---|---|
| 3,059,888 | 10/1962 | Lie | 403/109 |
| 3,741,067 | 6/1973 | Moran | 411/913 |
| 3,822,850 | 7/1974 | Elias | 248/200.1 |
| 4,378,187 | 3/1983 | Fullerton | 411/237 |
| 5,118,237 | 6/1992 | Wright | 411/433 |

Primary Examiner—Leslie A. Braun
Assistant Examiner—Robert Lipcsik
Attorney, Agent, or Firm—George R. McGuire

[57] ABSTRACT

A pole assembly comprising upper and lower, hollow, telescoping rods. An externally threaded member extends from a fixed attachment at the top end of the upper rod through a nut mounted within the top end of the lower rod. The nut is divided into two half-nuts which are radially movable into and out of threaded engagement with the threaded member. A third rod, slidingly surrounding the lower rod, may be pushed up to cause a pair of tapered teeth at its upper end to engage the half-nuts and move them out of engagement with the threaded member to permit free, relative, linear, axial movement of the upper and lower rods for fast adjustment of the overall length of the assembly. A pair of coil springs in recesses in the half-nuts urge the latter into a nesting fit in a conical inner wall of a bushing, wherein the half-nuts are threadedly engaged with the threaded member to permit fine adjustments of pole length by relative rotation of the upper and lower rods.

19 Claims, 5 Drawing Sheets

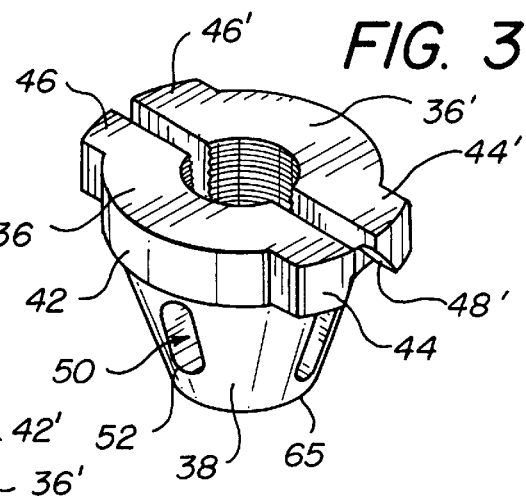
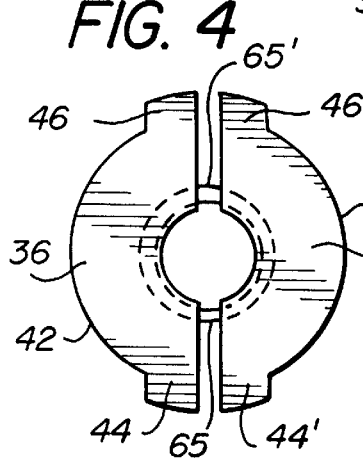
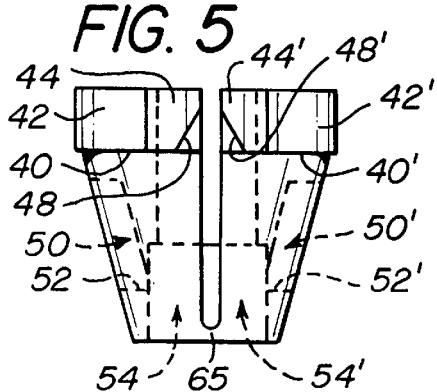
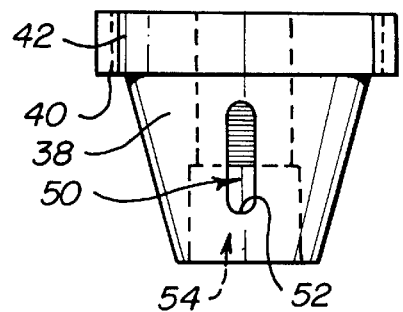
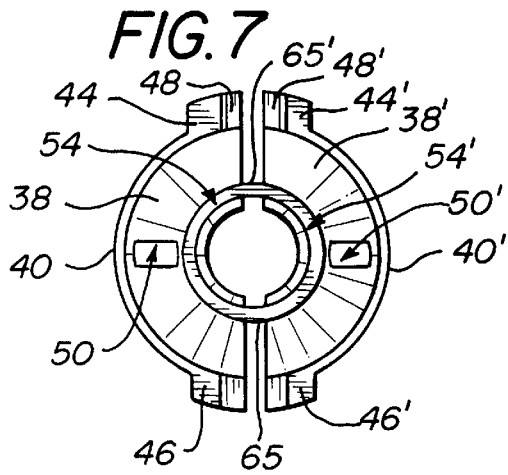
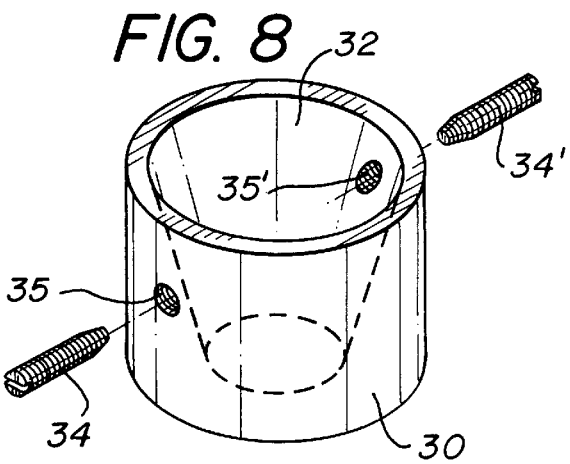

TELESCOPING POLE WITH QUICK LENGTH ADJUSTMENT

BACKGROUND OF THE INVENTION

The present invention relates to poles primarily intended for installation in a vertical orientation with end plates on the top and bottom of the pole in frictional engagement with the floor and ceiling. More specifically, the invention relates to telescoping poles having novel and improved means for effecting rapid adjustment of overall pole length.

U.S. Pat. No. 4,498,204, issued Feb. 12, 1985 to Stanley H. Warner, discloses a telescoping pole for installation between floor and ceiling primarily intended as a means for providing a physical support at a desired location for handicapped or infirm persons. A pair of telescoping sections are mutually attached by threaded engagement means and the overall length of the pole is adjustable by relative rotation of the two sections. End plates on the top and bottom of the pole are firmly engaged between floor and ceiling and the position of the pole, e.g., within a room or from one room to another, may be easily changed to suit the user's convenience.

A disadvantage of the adjustable pole of the aforementioned patent is the time required to effect length adjustments by relative rotation of the sections. Many revolutions may be required in order to effect a length change of only a few inches. Although means are provided for adjusting the length in axial increments independently of the threaded engagement, separate tools, as well as an appreciable amount of time and effort may be required to effect the final adjustment into tight engagement with floor and ceiling.

It is a principal object of the present invention to provide a pole having a plurality of telescoping sections with means for quickly and easily adjusting the axial length of the pole and locking the sections in the adjusted position until released.

Another object is to provide a multisection, telescoping pole having an axial length which may be manually extended or retracted quickly by relatively large increments without the use of tools.

Other objects will in part be obvious and will in part appear hereinafter.

SUMMARY OF THE INVENTION

As in the adjustable pole of the aforementioned patent, the pole of the present invention is intended primarily for removable installation between floor and ceiling, for which purpose it is equipped at its opposite ends with plates having planar, outwardly disposed, engagement surfaces. Since the pole is primarily intended for installation in a vertical orientation, its ends are referred to herein as "top" and "bottom," although such terms are used for convenience only and not to be construed in a limiting sense. Other such terms are used consistently with a vertical orientation of the pole.

In the disclosed embodiment, the pole comprises a pair of telescoping, hollow, tubular rods with top and bottom plates carried on the top end of the upper rod and bottom end of the lower rod, respectively. A threaded shaft is affixed at one end to the top end of the upper rod and extends axially therethrough for essentially the full length of the upper rod. The lower rod is closely surrounded by a third, hollow, tubular rod, termed a "push-up" rod, the upper end of which is closely surrounded by the lower end of the upper rod. The push-up rod may be manually moved axially, i.e., "pushed-up," with respect to both the upper and lower rods for a limited distance.

A bushing is fixedly attached within the upper end of the lower tube. A nut having threads engageable with the threaded shaft is divided in a plane extending through its central axis into two, separate halves. The outer surfaces of the "half-nuts" cooperatively define a conical surface tapering inwardly toward the lower end. A like-shaped surface forms the interior of the bushing, whereby the half-nuts are nested within and contact the inner surface of the bushing when they are in threaded engagement with the threaded shaft, i.e., the two halves are moved radially toward one another to the maximum extent wherein their internal threads engage the threaded shaft.

A pair of set screws or pins extend radially inwardly from opposite sides of the upper end of the lower rod through openings in the bushing to terminal ends within a recess in each of the half-nuts. A compression spring is placed within each recess with opposite ends abutting the respective set screw and a lower surface of the recess. Thus, the springs bias the half-nuts toward their lower positions, wherein they contact the conical bushing surface and threadedly engage the threaded shaft. The recesses are vertically elongated and have a width only slightly greater than the diameter of the set screws with the advantageous result that the set screws maintain the half-nuts in the desired orientations.

A pair of angled teeth extend upwardly from opposite sides of the upper end of the push-up rod, and are axially aligned with the divisions of the half-nuts. The push-up rod may be manually grasped and moved upwardly, relative to both the upper and lower rods, thereby moving the half-nuts upwardly, against the bias of the compression springs, and outwardly, due to the taper of the teeth on the push-up rod. The distance of axial movement of the push-up rod is relatively small, e.g., one inch or less. Movement of the half-nuts releases their threaded engagement with the threaded shaft, permitting free, telescoping movement of the upper and lower rods.

The aforementioned small clearance of the set screws and vertical edges of the recesses ensures that the half-nuts remain in the same rotational orientation with respect to the inner tube. Dimensional relationships between the recess, set screws and springs, as well as the distance of travel of the push-up rod, prevent dislodgement of the half-nuts from the bushing during movement of the half-nuts. Furthermore, the angled teeth are in engagement with the half-nuts at all times, i.e., both when the push-up rod is in its upper and lower positions, thus maintaining axial alignment of the push-up rod and the half-nuts.

The foregoing relationships further ensure that both the inner tube and push-up rod maintain rotational alignment with the half-nuts, as well as with one another. This, in turn, provides the necessary threaded engagement of the half-nuts with the threaded shaft when the half-nuts are moved from their upper to their lower, radially inward positions.

When the sections are moved to, or close to the desired overall pole length, the push-up rod is returned to its initial axial position. This permits movement of the half-nuts, under the biasing force of the compression springs, back into nesting contact with the bushing, with the threads of the half-nuts again threadedly engaged with the threaded shaft. Relatively small, final length adjustment, e.g., to bring the top and bottom plates into firmer engagement with the ceiling and floor, may then be quickly performed by relative rotation of the upper and lower rods, and thus of the threadedly mated shaft and half-nuts. Such rotation is facilitated by a pin extending radially through the lower rod and push-up rod; the pin is grasped by the user to rotate the lower rod as the upper rod is held stationary. This also augments the threaded engagement of the half-nuts and threaded rod.

The foregoing and other features of the structure and operation of the adjustable pole will be more readily understood and fully appreciated from the following detailed description, taken in conjunction with the accompanying drawings.

BRIEF DESCRIPTION OF THE DRAWINGS

FIGS. 3–7 are perspective, top plan, front elevational, side elevational and bottom plan, respectively, views of the half-nut elements of FIGS. 1 and 2;

FIG. 8 is a perspective view of other elements of the pole construction;

DETAILED DESCRIPTION

Figure 1:
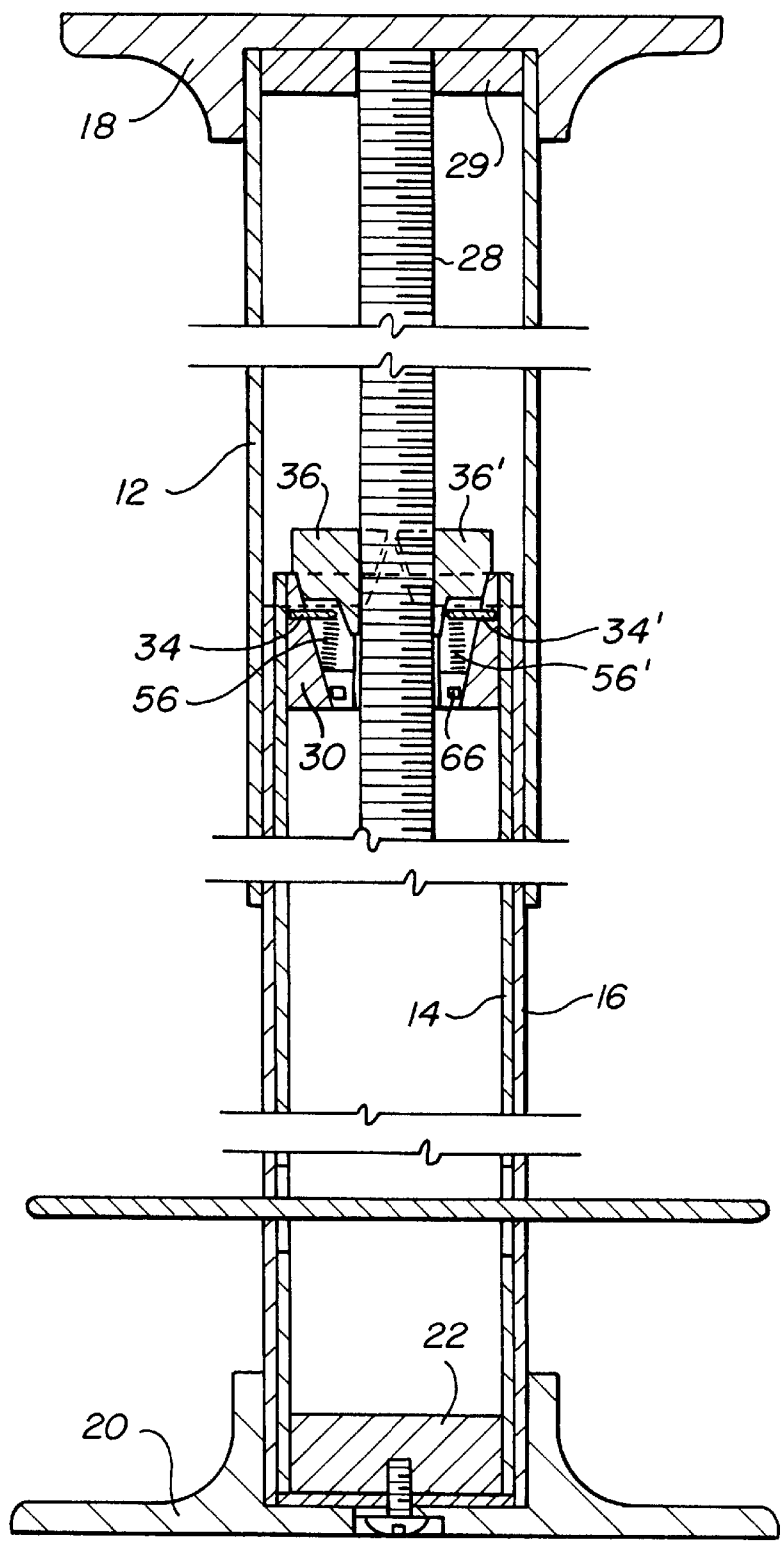
FIG. 1 is a front elevational view, in full section through the axial centerline, of the adjustable pole of the invention, with portions foreshortened.
Figure 2:
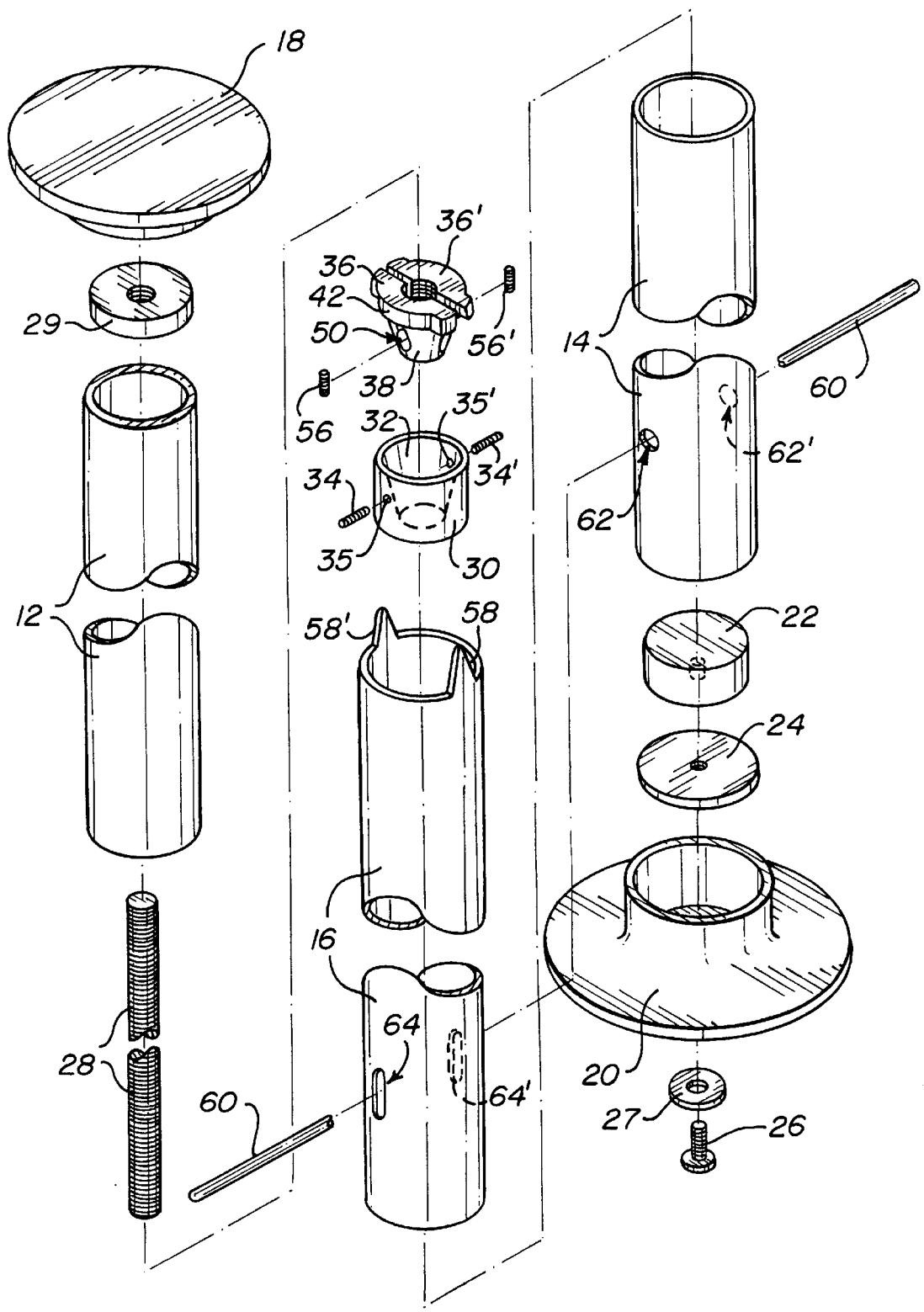
FIG. 2 is an exploded perspective view of the pole of FIG. 1, with some portions fragmented.

The adjustable pole of the present invention, denoted generally by reference numeral 10, includes elongated, hollow, tubular rods 12, 14 and 16, termed upper, lower and push-up rods, respectively. The inner and outer diameters of the rods are such that push-up rod 16 is slidingly received in upper rod 12, and lower rod 14 is slidingly received in push-up rod 16. The upper end of upper rod 12 is received in a recess in top plate 18, and the lower end of lower rod 14 is likewise received in bottom plate 20. The top and bottom plates have planar, outer surfaces for frictional engagement with respective abutment surfaces, e.g., a ceiling and floor, in the manner of the pole of aforementioned U.S. Pat. No. 4,498,204.

Bushing 22 is fixedly attached within the lower end of lower rod 14, the periphery of which rests upon washer 24 on the floor of the recess in bottom plate 20. Screw 26 extends through the central openings in relatively small and large washers 27 and 24, respectively, and is secured in a threaded bore in bushing 22 to permit axial rotation of lower rod 14 independently of bottom plate 20. Bushing 29 is fixedly mounted within the upper end of upper rod 12. Threaded shaft 28 is mounted upon bushing 29 and extends axially through upper rod 12 for substantially the full length thereof.

Bushing 30 is fixedly mounted within the upper end of lower rod 14, and has a through bore tapering inwardly from top to bottom, providing conical, inner wall 32 (FIG. 8). Set screws 34, 34' extend through radial openings 35, 35' in bushing 30 to terminal ends within the through bore. A nut having threads matable with threaded shaft 28 is divided into two, identical, structurally separate half-nuts 36, 36', shown independently of the other elements in FIGS. 3–7. When half-nuts 36, 36' are positioned with the threaded portions symmetrically arranged about a central axis, as shown, each "half" extends somewhat less than 180° about the central axis.

As will now be explained, half-nuts 36, 36' may be positioned in threaded engagement with shaft 28 to permit changing the overall length of pole 10 by relative rotation of upper and lower rods 12 and 14, as well as to maintain the relative axial position of the upper and lower rods stationary, at the desired pole length. The arrangement also provides for selective release of the threaded engagement so that the overall pole lengths may be changed by relative linear movement of the upper and lower rods, i.e., when the threaded engagement is released, pole length may be adjusted without relative rotation of the rods.

Outer surfaces 38, 38' of the lower portions of half-nuts 36, 36' taper inwardly from top to bottom at the same angle as inner wall 32 of bushing 30. Shoulders 40, 40' separate the lower, tapered portions of the half-nuts from upper portions having surfaces 42, 42' in a cylindrical plane surrounding the central axis. Upper portions 44 and 46 extend radially outwardly from opposite ends of cylindrical surface 42; portions 44' and 46', likewise extend from opposite ends of surface 42'. As best seen in FIG. 5, surfaces 48, 48' of portions 44, 44', respectively, are arranged at acute angles with respect to planes perpendicular to the central axis. Recesses 50, 50' extend into outer surfaces 38, 38', respectively, each recess having a lower surface or base 52, 52'. Counter-bores 54, 54' are unthreaded and extend from the lowermost ends of half-nuts 36, 36', respectively, to the threaded portions of the bores.

Coil springs 56, 56' are positioned within recesses 50, 50', respectively, with the lower ends of the springs engaging bases 52, 52' of the recesses and the upper ends engaging set screws 34, 34', respectively. Thus, springs 56, 56' exert a biasing force on half-nuts 36, 36' in a downward direction, toward a nesting fit within inner wall 32 of bushing 30 wherein the threads of the half-nuts are engaged with the threads of shaft 28. The elements are shown in this position in FIGS. 1 and 9.

Tapered teeth 58, 58' extend integrally from the upper end of push-up rod 16, on opposite sides thereof, in vertical alignment with the spaces separating the two half-nuts. While grasping upper rod 12 in one hand, push-up rod 16 may be grasped in the other hand and moved axially upwardly a short distance, e.g., about one inch. During such movement, tooth 58 engages angled surfaces 48 and 48' on one side of half nuts 36 and 36', respectively, while tooth 58' engages the angled surfaces on the opposite side. The half-nuts are thus moved upwardly and outwardly, releasing the threaded engagement of the half-nuts with shaft 28. The elements are shown in this position in FIG. 10. Upper rod 12 is then freely movable, axially upwardly or downwardly with respect to lower rod 14 to bring pole 10 approximately to the desired overall length.

Figure 9:
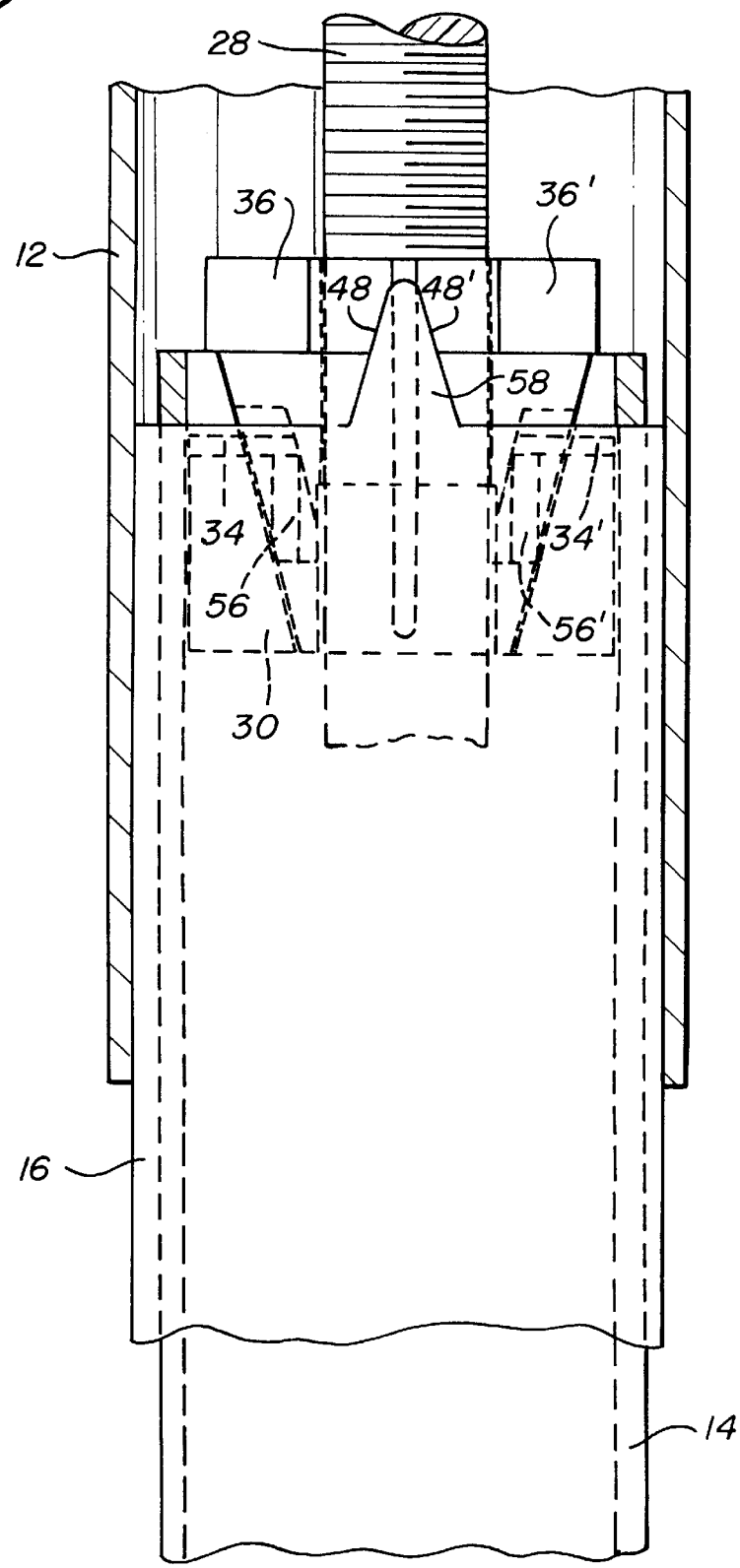
FIGS. 9 and 10 are fragmentary, enlarged, front elevational views, partly in section, showing portions of the pole in two positions of relative movement.

Push-up rod 16 is then moved axially downwardly by the biasing force of springs 56, 56' to its position of FIGS. 1 and 9. Springs 56, 56' are compressed as push-up rod 16 and half-nuts 36, 36' are moved to their upper positions and assist in returning the half-nuts to their lower positions. With the half-nuts again in threaded engagement with shaft 28, final adjustment of overall pole length may be performed by relative rotation of upper and lower rods 12 and 14. Such rotation is facilitated by bar 60 which extends through diametrically aligned openings 62, 62' in lower rod 14 and 64, 64' in push-up rod 16. Bar 60 is used as a lever to effect simultaneous rotation of rods 14 and 16, and thus half-nuts 36 and 36' as upper rod 12 and threaded shaft 28 remain stationary. Openings 64, 64' are vertically elongated to accommodate the aforementioned axial movement of the push-up rod independently of lower rod 14. Alternatively, the circular and elongated openings may be provided in push-up rod 16 and lower rod 14, respectively, which may be more desirable for cosmetic purposes.

Figure 10:
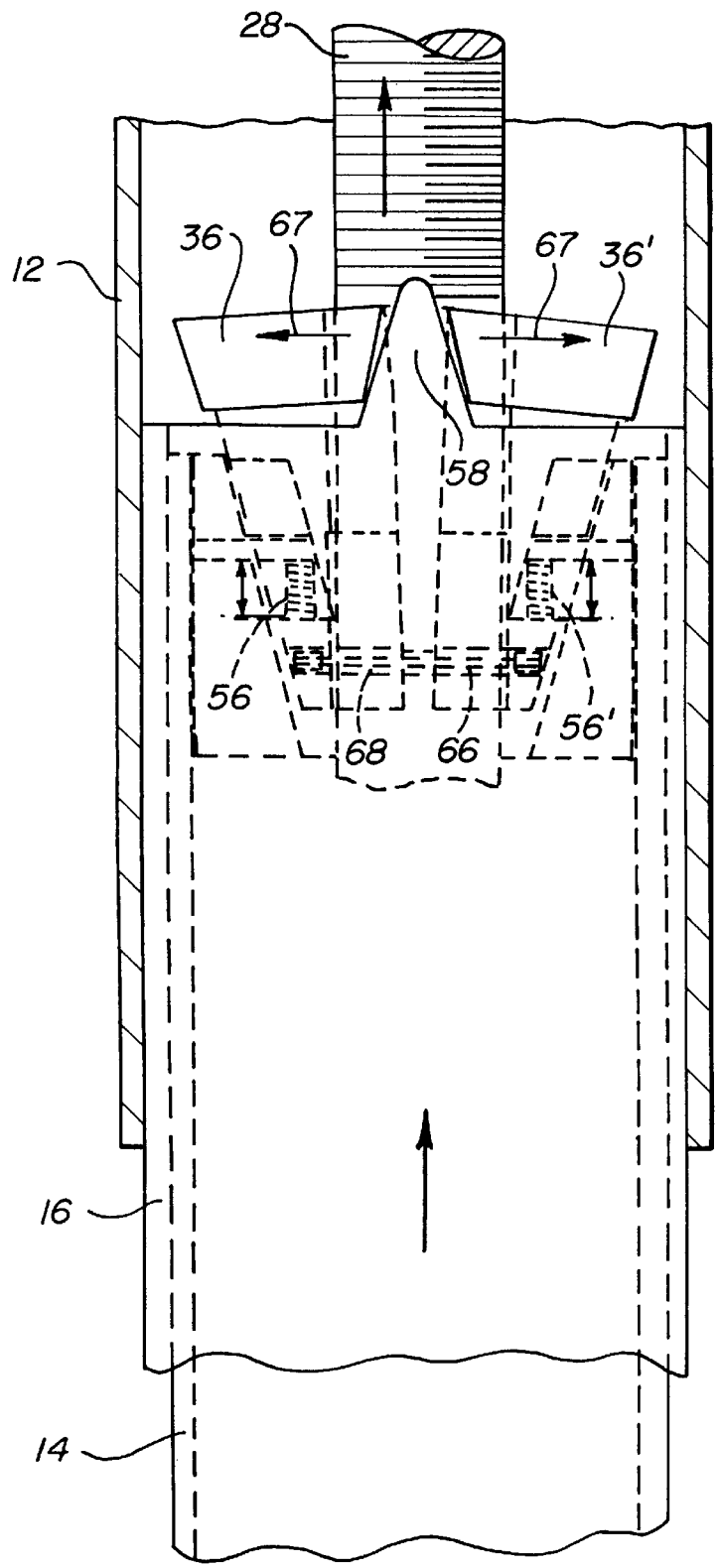

Means are provided for maintaining the half-nuts in the necessary relative axial orientation as the upper ends are flexed radially outwardly and inwardly as indicated by arrows 67 in FIG. 10. For example, physically separate half-nuts may be surrounded near their lower ends by a resilient ring such as that indicated at 66 in FIGS. 1 and 10. Ring 66 is positioned in an annular groove 68 in outer surfaces 38, 38' so as not to interfere with contact of surfaces 38, 38' with wall 32 of bushing 30. Ring 66, or similar biasing means, may assist in establishing and maintaining threaded engagement of half nuts 36, 36' with shaft 28. Alternatively, the half-nuts may be physically joined at their lower ends by bridge portions such as those denoted in FIGS. 3–5 and 7 by reference numerals 65, 65'. The bridge portions, while maintaining the lower ends of the half-nuts in fixed relation, permit flexure of the upper ends. This action is essentially the same as that found in conventional collet structures.

It should be noted that when plates 18 and 20 are tightly engaged with opposing, fixed surfaces push-up tube 16 cannot be lifted to move half-nuts 36, 36' out of threaded engagement with shaft 28. It is first necessary to effect relative rotation of the shaft and half-nuts to loosen engagement of plates 18 and 20 with the opposing surfaces. This provides a safety feature, preventing inadvertent or premature disengagement of the half-nuts from the threaded rod with possible sudden dropping of upper rod 12, plate 18, etc.

What is claimed is:

1. A pole assembly of selectively adjustable axial length comprising:
    a) first and second, elongated, hollow rods arranged for coaxial, telescoping, relative, axial movement;
    b) an elongated, externally threaded member fixedly attached at one end to said first rod and extending axially thereof into said second rod;
    c) an internally threaded nut positioned within said second rod and having threads matable with said threaded member said nut having a central axis and a plurality of sections selectively movable radially with respect to said central axis; and
    d) means for selectively placing said internally threaded nut in and out of threaded engagement with said threaded member, whereby the overall length of said pole assembly may be adjusted by said relative, axial movement of said first and second rods linearly and rotationally when said internally threaded nut is out of and in threaded engagement, respectively, with said threaded member.

2. The pole assembly of claim 1 wherein said first and second rods and said threaded member are all coaxial with said central axis.

3. The pole assembly of claim 1 wherein said means for selectively placing comprises a third hollow rod arranged for coaxial, telescoping, axial movement relative to said first and second rods.

4. The pole assembly of claim 3 wherein said third rod includes a portion which engages said internally threaded means as said third rod is moved axially relative to said first and second rods.

5. The pole assembly of claim 4 wherein said portion of said third rod comprises at least one tapered tooth extending axially from an end of said third rod which is positioned within said first rod.

6. The pole assembly of claim 3 wherein said means for selectively placing further comprises spring means biasing said internally threaded means toward movement in a direction toward or away from said threaded engagement.

7. The pole assembly of claim 6 wherein said internally threaded means comprises a nut having a central axis and at least two sections movable outwardly and inwardly with respect to said central axis, and said spring means biases each of said sections toward movement into threaded engagement with said threaded member.

8. The pole assembly of claim 7 wherein each of said sections has an upper and a lower end, said upper ends being radially movable with respect to said threaded member into and out of said threaded engagement.

9. In a pole assembly having a plurality of coaxially telescoping, hollow rods with an elongated, externally threaded member fixedly attached to and extending coaxially within a first of said rods and internally threaded means within a second of said rods, the improvement comprising:
    means for selectively moving said internally threaded means radially into and out of threaded engagement with said threaded member, whereby said first and second rods may be moved linearly and rotationally with respect to one another to adjust the axial length of said pole assembly when said internally threaded means is out of and in threaded engagement, respectively, with said threaded member.

10. The pole assembly of claim 9 wherein said means for radially moving comprises an element selectively moveable with respect to said first and second rods to engage and move said internally threaded means.

11. The pole assembly of claim 10 wherein said element comprises a third rod moveable axially with respect to said first and second rods.

12. The pole assembly of claim 11 wherein said third rod slidingly surrounds said second rod for substantially the entire length thereof.

13. The pole assembly of claim 9 wherein said internally threaded means comprises a nut having a central axis and divided into a plurality of sections in one or more planes parallel to said central axis.

14. A pole of selectively adjustable axial length comprising:
    a) first and second, hollow rods arranged for telescoping movement to adjust said axial length;
    b) an externally threaded shaft fixedly attached within said first rod and extending axially thereof into said second rod;
    c) a nut having upper and lower ends, inner and outer surfaces, and a central axis coaxial with said shaft, said nut being divided in one or more planes parallel to said central axis into at least two sections, said inner surface having threaded and unthreaded axial portions adjacent said upper and lower ends, respectively; and
    d) means for moving said sections radially with respect to one another and to said shaft while moving said nut axially with respect to said shaft between first and second positions wherein said threaded portion of said nut is in and out, respectively, of threaded engagement with said shaft.

15. The pole of claim 14 wherein said means for moving comprise first means for manual movement from said first to said second position, and second means for spring-assisted movement from said second to said first position.

16. The pole of claim 15 wherein said first means comprises a third rod manually movable telescopingly with respect to said first and second rods, said third rod having portions physically engaging said nut to simultaneously effect said axial movement of said nut and relative radial movement of said sections.

17. The pole of claim 15 wherein each of said nut sections include a recess and said second means comprises a coil spring disposed in each said recess.

18. The pole of claim 17 and further including means for constraining said axial movement of said nut to a linear path.

19. The pole of claim 18 wherein said constraining means comprise a slot having side edges substantially parallel to said central axis and communicating with said recess in each of said sections, and a stub shaft fixed with respect to said second rod and extending through said slot in each of said sections, said stub shafts having a width slightly less than the width of the slot through which it extends.

* * * * *